Patented Jan. 24, 1933

1,895,088

UNITED STATES PATENT OFFICE

BERT S. TAYLOR, OF STOW, OHIO, ASSIGNOR TO THE B. F. GOODRICH COMPANY, OF NEW YORK, N. Y., A CORPORATION OF NEW YORK

COLORED RUBBER PRODUCT AND METHOD OF COLORING RUBBER

No Drawing. Application filed March 28, 1930. Serial No. 439,859.

This invention relates to the art of coloring rubber, and particularly to the coloring of rubber by the application of coloring matter to the surface thereof.

This invention consists in coloring rubber articles or portions thereof by applying dyes or other coloring matter to the surface of the rubber either before or after vulcanization, but after the rubber has been formed to approximately its final shape. The invention comprises numerous specific embodiments, some of which will be described herein.

In general, it is of considerable importance that the rubber which is to be treated should have a proper composition. It may be white or it may be colored by incorporating a colored pigment or dye of any color sufficiently light that another color impressed thereon will not be completely masked. It should not contain any vulcanizing ingredient or other substance antagonistic to or incompatible with the dye or other coloring matter which is to be employed. Many dyes are not appreciably affected either by the sulphur chloride employed in cold vulcanization or by the sulphur and accelerators employed in hot vulcanization, and may consequently be applied to the rubber either before or after vulcanization. Those dyes which are affected are generally limited in their employment to a process in which the rubber is treated after vulcanization.

The rubber should contain a moderate proportion of an inert filler, the function of which is to present reflecting surfaces within the rubber, rendering the rubber translucent rather than transparent, and brightening and intensifying the color. An addition of from 5 to 50 per cent. by volume of a pigment of medium fineness such as whiting, barytes, silica, etc. has the desired effect, the exact proportion to be added depending on the fineness of the pigment, the magnitude of the difference between its index of refraction and that of the rubber, and on the physical properties which it is desired to impart to the rubber.

Such pigments as magnesia which have an index of refraction quite close to that of rubber are not suitable, for they do not render the rubber translucent unless used in excessive amounts. Small proportions only of such pigments as zinc oxide or lithopone, which have a high index of refraction and a correspondingly good covering power, need be added and care should be taken not to render the rubber completely opaque and hence to mask the color of the dye too much.

The rubber is prepared and shaped in the ordinary well-known manner. Pigments, softeners, vulcanizing agents, etc. may be mixed with the rubber by mastication, the plastic unvulcanized rubber subsequently being molded, calendered, extruded, or otherwise brought to the desired shape. If the rubber is prepared directly from a liquid dispersion, such as latex or cements, the pigments and other ingredients mentioned above may be intimately dispersed in the liquid containing the rubber. The rubber may then be shaped by dipping forms in the dispersion, by coagulation or electro-deposition on forms, or otherwise, the rubber then being thoroughly dried.

Shaped rubber articles are colored by applying a coloring material to that portion of each article which is to acquire the color. If the coloring material is an oil soluble dye, it is dissolved in a rubber solvent, preferably one which is completely volatile, but does not evaporate very rapidly, and one capable of dissolving fairly large proportions of the dyes. Xylene has been found to serve very well as a solvent for the dyes, but other solvents such as toluene, gasoline, chloroform, etc. may be substituted in many cases. The solution of the dye is applied to the rubber by painting or spraying, or even by dipping the rubber therein.

The solvent is rapidly absorbed by the rubber, carrying the dye with it. As the solvent later evaporates, the dye remains behind in the rubber. The oil-soluble dyes are generally quite soluble in rubber and possess the property of migrating through the rubber until they permeate its entire thickness. At the same time this migration of the oil-soluble dyes through the rubber is sufficiently slow that when the dye is applied to the surface of the rubber in a pattern or design, the edges of the pattern remain quite distinct and well defined even over a period of months or years. It is therefore possible to apply dyes of different colors to different parts of the surface of rubber articles, producing brilliantly colored, variegated, mottled, or figured rubber in a very simple and inexpensive manner.

The method of this invention is particularly advantageous in that it permits the rubber goods manufacturer to mix, handle, shape, and even vulcanize, a single, colorless base stock, and to color individual articles made from this stock with a large number of different colors, either in solid colors, or in an innumerable variety of patterns, and even permits him to color the individual parts of the same article with any number of different colors.

If desired a part of a rubber article may be made of a rubber stock colored in the ordinary manner by incorporating a colored pigment therein, another portion being left uncolored, but being colored at any later time by the method of this invention. In such a case it will be desired to prevent the dye from migrating from the one portion of the rubber into the other and discoloring it, or even migrating and diffusing so far afield that an insufficient quantity of the color remains where it was originally applied. Such intermigration of oil-soluble dyes between the various portions of a rubber article may be largely prevented by interposing between the various portions a thin layer of a rubber compound which is not readily penetrated by the dye. Such layers may contain a pigment composed of minute interleafing flakes, such as aluminum flake, mica, or graphite. The flakes may be admixed in a rubber cement which is interposed between the different colored portions of the rubber article, or the portions may be coated with an ordinary cement, dusted with the flakes, and again coated with cement before they are adjoined. Intermigration or diffusion may also be prevented by interposing a layer of rubber containing a high proportion of a hydrophyllic colloid such as casein or glue.

In many cases it will be desired to color the surface only of a rubber article, without substantial diffusion of the dye through the rubber. This may be accomplished in a number of ways, all of which depend on the use of a dye which is not appreciably soluble in rubber or other hydrocarbons. Thus, water-soluble dyes or alcohol-soluble dyes may be applied to the rubber in solution in water or alcohol until the surface of the rubber is sufficiently deeply colored. The dye will not penetrate very deeply because of its comparative insolubility in the rubber.

If the dye exhibits a tendency to bleed from the rubber or to wash out when the rubber is subjected to the action of water or other liquids the rubber may be coated by a thin transparent protective layer, which may consist of rubber, plasticized nitrocellulose lacquer, etc. If this protective coating is of rubber it is preferably applied in the form of a cement or of liquid latex, dried and vulcanized.

The surface of rubber may likewise be colored by incorporating a mordant in the rubber and thereafter treating the surface with a solution of a dye. The dye is then fixed in the surface of the rubber, but does not penetrate far into the rubber.

In many cases it is possible to synthesize the dye within the rubber itself, by incorporating one constituent of the dye in the rubber and later treating the surface of the rubber with the other constituent. For example, an amine or a phenol may be incorporated in the rubber, which is thereafter treated with a diazo salt, whereupon the surface of the rubber acquires the color of the corresponding dye.

Still another possibility is to treat the surface of the rubber with a color base until a sufficient quantity is absorbed, and expose it to the atmosphere to permit the oxidation of the base and the development of the color.

*Example 1.*—As a specific example of one embodiment of this invention, a rubber compound is prepared containing approximately 100 parts by weight of rubber, 50 parts whiting (about 15% by volume), 5 parts zinc oxide, 3 parts sulphur, ½ part organic accelerator, and if a soft stock is desired, from 5 to 10 parts of a light-colored neutral mineral oil. After a thorough mixing and mastication the compound is calendered to a suitable thickness for the subsequent manufacture of specific articles therefrom. Blanks of the calendered stock are then molded and vulcanized, say in the form of bath caps. At this stage the bath caps are all of a somewhat translucent white color, and are completely manufactured except that the color is lacking.

Solutions of oil-soluble dyes of various colors in xylene in a concentration of 5 to 10% are prepared. One group of bath caps is dipped bodily in the dye solutions, drained, and allowed to dry to give solid colors. If no one of the dyes represents the exact shade of color desired, two or more dyes may be mixed or the bath caps may be dipped successively in several dye solutions. In the course of one or two days the migration of the dye is substantially complete and the color is uniform throughout the mass of the rubber.

Another group of bath caps is colored by covering portions of the rubber with stencils or masks and painting or spraying dye solutions on the exposed areas. After a short time, when the first dye solution is substantially absorbed by the rubber, a different stencil or mask may be applied and a different dye solution is applied in the same manner.

If the areas covered by the two dyes overlap, three colors are obtained with only two dyes, the overlapping area presenting the composite color of the two dyes. If desired, a ground color may be imparted to the rubber by dipping in another dye, either before or after the treatment described above. The variety of patterns and color combinations obtainable is practically endless, being limited only by the ingenuity and skill of the operator.

Mottled effects may be obtained by applying irregular blotches of various dye solutions to the rubber.

*Example 2.*—A rubber compound such as that described in Example 1 above is prepared and blanks are cut out, of the proper size for the manufacture, say of a molded hot water bottle. Before they are placed in the mold the blanks are painted with dye solutions over a restricted portion of their surface. The migration of the dye during vulcanization, combined with the slight flow which the rubber undergoes during the molding gives rise to a pleasing irregularity of design and color of the article.

*Example 3.*—A rubber composition similar to that described in Example 1 above is mixed with a mordant, say about 1 part of tannin and is reduced to a soft dough by the addition of a naphtha. The dough is spread on the surface of a fabric, dried, and vulcanized. The rubber surface is then printed with any desired pattern in one color or a combination of colors in an ordinary color press, aqueous solutions of dyes being employed for the printing. The colors are fixed by the mordant in the rubber, but to protect them still further a thin rubber cement is applied and is vulcanized in the vapor of sulphur chloride. Alternatively, a solution of nitrocellulose in a mutual solvent for nitrocellulose and rubber may be employed as a protective coating in place of the rubber cement. The solvent, such as cyclohexanol, terpineol, tetrahydronaphthaline, etc. assures the adhesion of the coating to the rubber base. The coating should contain a high proportion of a plasticizer such as tricresyl phosphate, dibutyl phthalate, benzyl benzoate, etc. to render it sufficiently flexible and extensible.

*Example 4.*—A white sidewall tire is manufactured and vulcanized in the customary manner. The tire may be sold in that condition, or if the customer prefers a colored tire to match the color of his car or to contrast with it, the sidewall is painted before delivery with a solution of a dye of the color desired.

It is preferred to make the sidewalls of a compound much less heavily pigmented than that ordinarily employed in tire manufacture. A compound of the general nature of that described in Example 1 above is satisfactory. It is also preferred to attach the sidewall to the carcass of the tire by means of a cement which will retard migration and diffusion of coloring matter. For example, a cement containing aluminum flake, or glue, or both, substantially prevents discoloration of the sidewall by dark colored ingredients migrating from the bead, carcass, or tread of the tire, and at the same time assists in retaining the dye within the sidewall itself.

If desired, the surface of the tire may be coated with a transparent flexible varnish or lacquer, or other suitable protective coating, which may be repeatedly washed and polished without affecting the color of the rubber. The plasticized nitrocellulose solution mentioned in Example 3 above is particularly advantageous because it is not affected by oil and grease which may drip from the bearings of the car, and may readily be cleaned by sponging off with water or gasoline.

It is to be understood that the specific methods hereinabove described are only illustrative and that numerous other modifications are possible within the spirit and scope of this invention. It is therefore not intended to limit this invention except as may be required by the prior art and as indicated in the appended claims.

I claim:

1. The method of manufacturing a colored rubber article which comprises incorporating in rubber from 5 to 50 per cent. by volume of inert pigment of medium covering power, but only minor proportions of pigments of good covering power, shaping the rubber to approximately its final shape, and applying a solution of an oil soluble dye in a rubber solvent to the surface of the rubber.

2. The method of manufacturing a colored rubber article which comprises incorporating in rubber from 5 to 50 per cent. by volume of colorless inert pigment of medium covering power, but only minor proportions of pigments of good covering power, shaping and vulcanizing the rubber, and applying a solution of an oil soluble dye in a rubber solvent to the surface of the rubber.

3. The method of manufacturing a varicolored rubber article which comprises uniting two parts of a rubber article by means of a layer containing a substance adapted to retard migration, and coloring at least one of the parts with a migrating coloring material.

4. The method of manufacturing a varicolored rubber article which comprises uniting two parts of a composite rubber article with a layer of rubber containing a substance adapted to retard migration, one of the parts being colored by the incorporation of pigments therein, vulcanizing the article, and applying dye to the part not colored by the pigments.

5. A varicolored rubber article comprising two parts, variously colored, connected by a layer of a compound containing a substance adapted to retard migration of coloring materials.

6. A varicolored rubber article comprising a part colored by the incorporation of coloring material therein, a part colored by the absorption of dye through its surface, and a layer interposed therebetween of a rubber compound containing a substance adapted to retard the migration of the respective coloring materials.

7. A colored rubber article comprising a rubber compound containing from 5 to 50 per cent. by volume of inert pigment of medium covering power, but only minor proportions of pigments of good covering power, and dye absorbed through the surface of the compound.

8. The method of manufacturing a varicolored rubber article which comprises uniting two parts of a composite rubber article with a layer of rubber containing a substance adapted to retard migration, one of the parts being colored by the incorporation of pigments therein and the other part containing from 5 to 50 per cent. by volume of colorless inert pigment of medium covering power, but only minor proportions of pigments of good covering power, shaping and vulcanizing the rubber, and applying oil-soluble dye in a rubber solvent to the part not colored by pigments.

9. A method as in claim 8 in which the varicolored rubber article is coated with an adherent, flexible, protective film.

10. A varicolored rubber article comprising a part colored by the incorporation of coloring material therein; another part containing from 5 to 50 per cent. by volume of an inert pigment of medium covering power, but only minor proportions of pigments of good covering power, and dye absorbed through the surface of the compound; and a layer of a rubber compound containing a substance adapted to retard the migration of the respective coloring materials, interposed between the said parts.

11. An article as in claim 10, which has a flexible, firmly adherent protective film covering the part colored by absorption of the dye.

12. The method of making a colored tire which comprises vulcanizing a tire structure comprising a tread, a white sidewall, and a layer of a composition adapted to retard migration between the sidewall and the remainder of the tire, and applying oil-soluble dye to the sidewall.

13. The method of making a colored tire which comprises vulcanizing a tire structure comprising a tread, a white sidewall, and a layer of a composition adapted to retard migration between the sidewall and the remainder of the tire, applying oil-soluble dye to the sidewall, and coating the colored sidewall with a layer of a transparent, flexible, oil-resistant coating composition.

14. A resilient tire comprising a tread, and a sidewall colored by an organic dyestuff and containing from 5 to 50 per cent. by volume of inert pigment of medium covering power, but no substantial proportions of colored pigments or pigments of high covering power.

15. A colored pneumatic tire comprising a tread portion, a layer of a composition interposed between the sidewall and the remainder of the tire adapted to retard the migration of coloring materials, and a sidewall containing from 5 to 50 per cent. by volume of inert pigment of medium covering power, but no substantial proportions of colored pigments or pigments of high covering power, and dyestuff absorbed by the surface of said sidewall.

16. A tire as in claim 15 in which the colored surface is protected by a layer of transparent, flexible, oil-resistant coating composition.

17. A tire as in claim 15 in which the colored surface is protected by a layer of plasticized nitro-cellulose composition.

In witness whereof I have hereunto set my hand this 26th day of March, 1930.

BERT S. TAYLOR.